United States Patent [19]

Hale et al.

[11] Patent Number: 5,423,379

[45] Date of Patent: Jun. 13, 1995

[54] SOLIDIFICATION OF WATER BASED MUDS

[75] Inventors: Arthur H. Hale, Houston; Kenneth M. Cowan, Sugarland, both of Tex.

[73] Assignee: Shell Oil Company, Houston, Tex.

[21] Appl. No.: 191,733

[22] Filed: Feb. 4, 1994

Related U.S. Application Data

[60] Division of Ser. No. 38,040, Mar. 24, 1993, abandoned, which is a continuation of Ser. No. 751,399, Aug. 28, 1991, abandoned, which is a division of Ser. No. 671,627, Mar. 19, 1991, Pat. No. 5,058,679, which is a continuation-in-part of Ser. No. 641,794, Jan. 16, 1991, abandoned, which is a continuation-in-part of Ser. No. 457,429, Dec. 27, 1989, abandoned.

[51] Int. Cl.[6] .............................................. E21B 33/13
[52] U.S. Cl. ................................... 166/293; 166/292; 175/65
[58] Field of Search .................. 166/292, 293; 175/65; 106/714, 724, 726, 790

[56] References Cited

U.S. PATENT DOCUMENTS

| | | |
|---|---|---|
| 2,416,035 | 2/1947 | Whittler . |
| 2,649,160 | 8/1953 | Williams et al. . |
| 2,822,873 | 2/1958 | Harmsen et al. . |
| 2,880,096 | 3/1959 | Hurley . |
| 2,895,301 | 7/1959 | Casagrande et al. . |
| 2,938,353 | 5/1960 | Vorenkamp . |
| 2,961,044 | 11/1960 | Shell . |
| 3,021,680 | 2/1962 | Hayward . |
| 3,168,139 | 2/1965 | Kennedy et al. . |
| 3,412,564 | 11/1968 | McClintock . |
| 3,499,491 | 3/1970 | Wyant et al. . |
| 3,525,688 | 8/1970 | Swanson . |
| 3,557,876 | 1/1971 | Tragesser . |
| 3,615,785 | 10/1971 | Moorer et al. ...................... 106/724 |
| 3,670,832 | 6/1972 | Striegler . |

(List continued on next page.)

FOREIGN PATENT DOCUMENTS

| | | | |
|---|---|---|---|
| 324887A | 1/1988 | European Pat. Off. ...... | C09K 07/00 |
| 374671A | 12/1988 | European Pat. Off. ...... | C09K 07/06 |
| 382070A | 2/1989 | European Pat. Off. ...... | C09K 07/06 |
| 382071A | 2/1989 | European Pat. Off. ...... | C09K 07/06 |
| 386636A | 3/1989 | European Pat. Off. ...... | C09K 07/06 |
| 386638A | 3/1989 | European Pat. Off. ...... | C09K 07/06 |
| 391251A | 4/1989 | European Pat. Off. ...... | C09K 07/06 |
| 391252A | 4/1989 | European Pat. Off. ...... | C09K 07/06 |
| 398112A | 5/1989 | European Pat. Off. ...... | C09K 07/02 |
| 398113A | 5/1989 | European Pat. Off. ...... | C09K 07/02 |
| 399270A1 | 5/1989 | European Pat. Off. ...... | C09K 07/02 |
| 374672A | 12/1989 | European Pat. Off. ...... | C09K 07/06 |
| 2216573A | 10/1989 | United Kingdom ........ | C09K 07/02 |
| 2216574 | 10/1989 | United Kingdom . | |
| 2216574A | 10/1989 | United Kingdom ........ | C09K 07/02 |
| 2223255 | 4/1990 | United Kingdom . | |
| 2223255A | 4/1990 | United Kingdom ........ | C09K 07/06 |

OTHER PUBLICATIONS

"Guide to Drilling, Workover, and Completion Fluids", *World Oil*, Jun. 1978, pp. 56–98.

"Deep Cement Mixing Experience in Japan", by G. Dennis et al., Copyright 1985 Seabed Strengthening Symposium, Denver, Colorado, Jun. 4, 1985, TP-85-5.

"Mud Disposal: An Industry Perspective", Hanson et al., *Drilling*, May 1986, pp. 16–21.

"Waste Minimization Program Can Reduce Drilling Costs", Hale et al., Oryx Energy Co., Houston, Texas, *Oil & Gas Journal*, Jul. 1, 1991, pp. 43–46.

"Phosphoric Acids and Phosphates", Kirk-Othmer Enc. of Chemical Technology, 3rd Ed., vol. 17, p. 477.

"Conversion of Drilling Fluids to Cements with Blast Furnace Slag-Performance Properties and Applications for Well Cementing", SPE Paper 24575 (Oct. 4, 1992), Cowan et al.

"Quantitative Interpretation of X-Ray Diffraction Pattersn of Mixtures. I. Matrix-Flushing Method for Quantitative Multicomponent Analysis" by Frank H. Chung, *J. Appl. Cryst.*, 1974, pp. 519–525.

*Primary Examiner*—George A. Suchfield

[57] ABSTRACT

A drilling mud is converted in-situ to a cement by addition of blast furnace slag.

4 Claims, 3 Drawing Sheets

5,423,379
Page 2

U.S. PATENT DOCUMENTS

| | | | |
|---|---|---|---|
| 3,675,728 | 7/1972 | Faulk et al. | |
| 3,712,393 | 1/1973 | Sheidahl et al. | |
| 3,724,562 | 4/1973 | Striegler | |
| 3,820,611 | 6/1974 | King | |
| 3,835,939 | 7/1974 | McEntire | |
| 3,887,009 | 6/1975 | Miller et al. | |
| 3,936,408 | 2/1976 | Adams et al. | 106/808 |
| 3,962,878 | 6/1976 | Hansen | |
| 3,964,921 | 6/1976 | Persinski et al. | 106/806 |
| 4,011,909 | 3/1977 | Adams et al. | 106/811 |
| 4,037,424 | 7/1977 | Anders | |
| 4,040,854 | 8/1977 | Persinski et al. | 106/728 |
| 4,053,323 | 10/1977 | Adams et al. | 106/764 |
| 4,057,116 | 11/1977 | Striegler | |
| 4,095,987 | 6/1978 | Walker | 106/648 |
| 4,114,692 | 9/1978 | Gallus | 106/717 |
| 4,215,952 | 8/1980 | Baardsen | |
| 4,252,471 | 2/1981 | Straub | |
| 4,299,516 | 11/1981 | Miyoshi et al. | |
| 4,335,980 | 6/1982 | DePriester | |
| 4,338,134 | 7/1982 | Graf zu Munster | |
| 4,374,738 | 2/1983 | Kelley | 507/108 |
| 4,425,055 | 1/1984 | Tiedemann | |
| 4,427,320 | 1/1984 | Bhula | |
| 4,460,292 | 7/1984 | Durham et al. | |
| 4,519,452 | 5/1985 | Tsao et al. | |
| 4,664,843 | 5/1987 | Burba, III et al. | |
| 4,668,128 | 5/1987 | Hartley et al. | |
| 4,720,214 | 1/1988 | Brasted et al. | |
| 4,760,882 | 8/1988 | Novak | |
| 4,761,183 | 8/1988 | Clarke | |
| 4,767,549 | 8/1988 | McEwen et al. | |
| 4,780,220 | 10/1988 | Peterson | 252/8.514 |
| 4,790,954 | 12/1988 | Burba, III et al. | |
| 4,802,998 | 2/1989 | Mueller et al. | 252/8.514 |
| 4,880,468 | 11/1989 | Bowlin et al. | |
| 4,883,125 | 11/1989 | Wilson et al. | |
| 4,897,119 | 1/1990 | Clarke | |
| 4,913,585 | 4/1990 | Thompson et al. | |
| 4,942,929 | 7/1990 | Malachosky et al. | |
| 5,004,506 | 4/1991 | Allen et al. | 106/729 |
| 5,016,711 | 5/1991 | Cowan | 106/724 |
| 5,026,215 | 6/1991 | Clarke | |
| 5,058,679 | 10/1991 | Hale et al. | |
| 5,076,373 | 12/1991 | Hale et al. | 175/65 X |
| 5,086,850 | 2/1992 | Harris et al. | |
| 5,105,885 | 4/1992 | Bray et al. | |
| 5,106,423 | 4/1992 | Clarke | |
| 5,121,795 | 6/1992 | Ewert et al. | |
| 5,123,487 | 6/1992 | Harris et al. | |
| 5,125,455 | 6/1992 | Harris et al. | |
| 5,127,473 | 7/1992 | Harris et al. | |

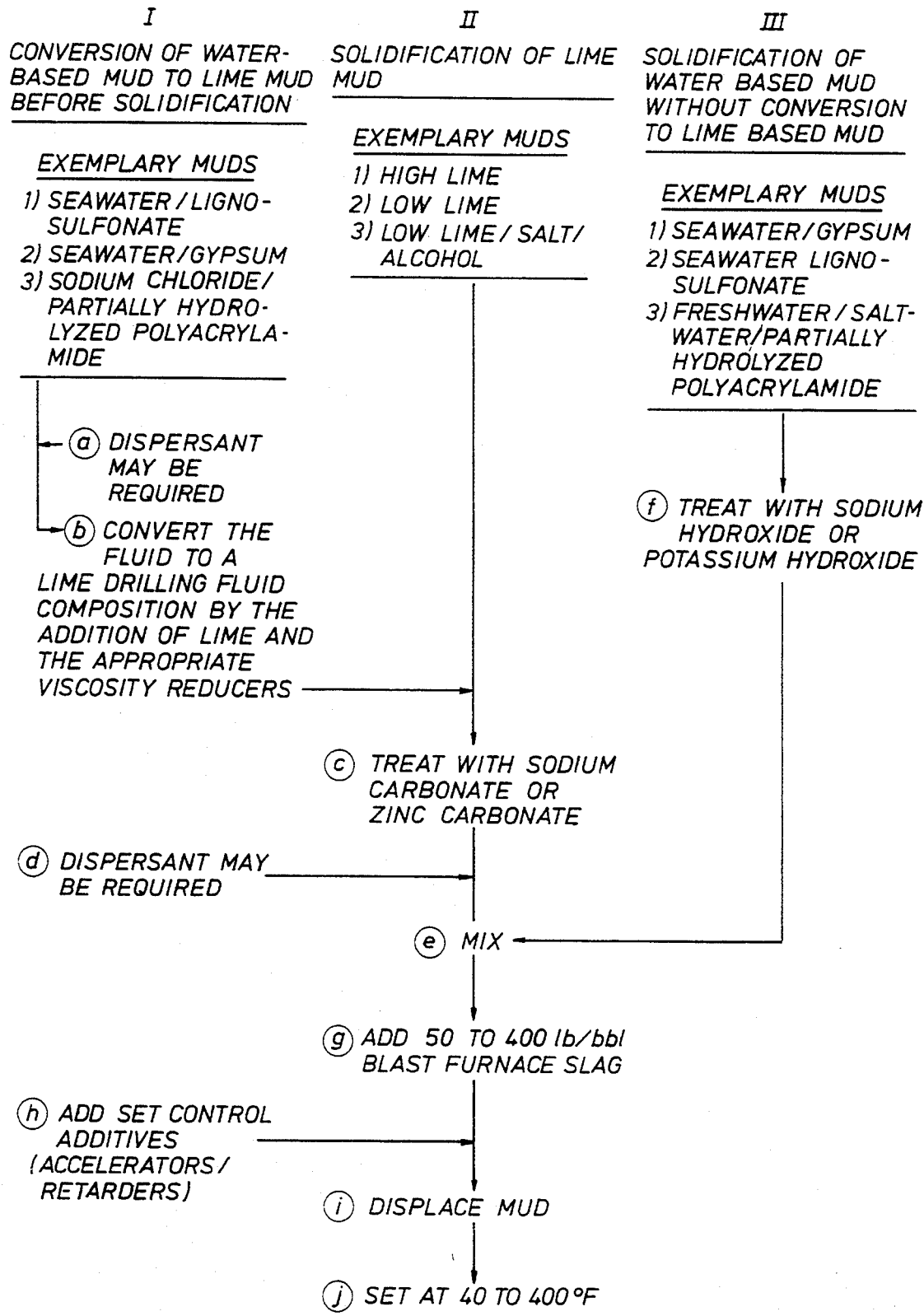

SOLIDIFICATION OF WATER BASED MUDS

This is a division of Ser. No. 08/038,040 filed on Mar. 24, 1993, now abandoned, which is a continuation of 07/751/399 filed Aug. 28, 1991, now abandoned, which is a division of Ser. No. 07/671,627 filed Mar. 19, 1991, now U.S. Pat. No. 5,058,679), which is a continuation in part of Ser. No. 07/651/794 filed Jan. 16, 1991, now abandoned, which is a continuation in part of Ser. No. 07/457,429 filed Dec. 27, 1989, now abandoned.

BACKGROUND OF THE INVENTION

1. Field of the Invention

The present invention pertains to improvements in compositions and methods for zonal isolation for vertical, deviated, and horizontal oil and gas wells. The method involves the in-situ solidification of water based drilling muds to compressive strengths well in excess of that required for casing support, zonal isolation, and borehole stability.

2. Description of Prior Art

The general procedure of drilling an oil or gas well includes drilling a borehole using a drilling fluid. Subsequent to drilling the borehole, casing is run into the well and a cement slurry is placed in the annulus between the outside of the casing and the borehole wall. Typically, the cement slurry is placed in the annulus using a successive fluid displacement technique. In this technique, the cement is first pumped into the casing. Another fluid, often drilling fluid or water, is pumped behind the cement to displace it out the bottom of the casing and up into the annulus between the casing and borehole wall. The cement slurry is usually raised to a point above the uppermost section of the formations to tie isolated and may be raised into the annulus between the casing string being cemented and a previously cemented casing.

Once placed, the purpose of the cement slurry is to harden in the annulus and provide an effective seal between the casing and the borehole. The hardened cement sheath prevents or inhibits communication of fluids between the various formations penetrated by the well. In addition to providing zonal isolation, the cement is in contact with the casing and provides mechanical support and resistance to axial movement through the shear bond developed between the interfaces of cement and pipe and cement and formation.

Bonding of the cement to the casing and borehole surfaces is critical to providing an effective seal in the annulus and for providing support for casings. Under most conditions, tile bonding of cement to casing is achieved through contact of the cement particles with the surface of the casing. The resulting region of contact provides a mechanical interface which impedes movement of the casing due to high frictional forces. A fluid seal between cement and casing is effected by close contact of the cement particles at the casing surfaces which results in a region of very low effective permeability that prevents fluid migration along the interface.

Bonding between the cement and borehole wall is also achieved through contact of the cement particles with the formation or drilling fluid filter cake commonly deposited at the borehole wall during the drilling of the borehole. However, bonding between the cement and casing and borehole surfaces is not always readily achievable, especially where the drilling fluid and cement are not compatible, which is not uncommon.

Accordingly, the present invention is directed to overcoming the above noted problem in the art, and in particular to problems experienced with effective placement of casing in oil and gas wells.

SUMMARY OF THE INVENTION

It is the primary purpose of the present invention to provide compositions and methods for in-situ solidification of water based drilling muds.

The purpose of the invention is achieved through the in-situ solidification of water-base drilling fluids through the addition of blast furnace slag, set-time control additives, and theology modifying additives. After treatment with the blast furnace slag, usually by adding about 50 to 400 pounds of slag per standard (42-gallon) barrel of drilling fluid, the fluid is displaced to a preselected location and allowed to harden. The setting and hardening time of the slag-treated drilling fluid can be varied to meet the temperature conditions in the wellbore and the requirements for displacing time. Setting times can be controlled from between about one hour up to several days at a temperature between about 40° F. and 400° F.

The invention is particularly desirable for in-situ solidification of drilling fluids containing polyhydric alcohols. Drilling fluids containing acyclicpolyols such as polyglycerols, polypropylene glycols, polyethylene glycols, polyethylenepropylene glycols, cyclicetherpolyols, and polycyclicpolyetherpolyols can be very effectively solidified in-situ through the use of this invention.

Other purposes, distinctions over the art, advantages and features of the invention will be apparent to one skilled in the art upon review of the following.

DESCRIPTION OF THE DRAWINGS

FIG. 3 provides process flow schemes.

DESCRIPTION OF PREFERRED EMBODIMENTS

Figure 1:
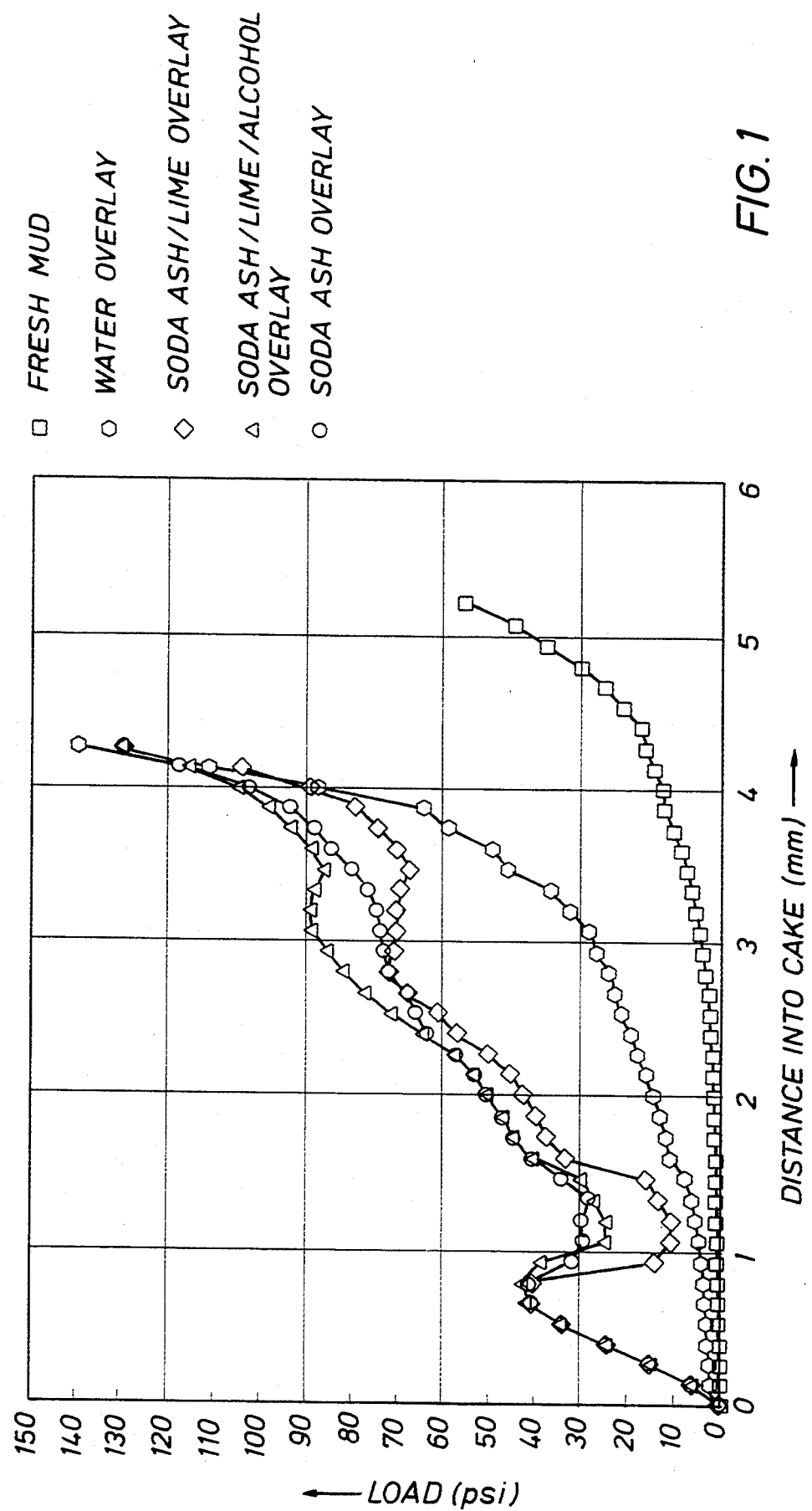
FIGS. 1 and 2 show results which indicate that the filter cake of the mud will harden.

The following preferred embodiments of the invention, together with the following examples, explain the principles of the invention.

The present invention provides a unique method and compositions which are devised to provide zonal isolation for vertical, deviated, and horizontal wells. The invention centers around the solidification of water based muds to compressive strengths well in excess of that required for casing support, zonal isolation, and borehole stability.

Water-based drilling fluids typically include water and several other additives such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid. The term water base means that water is the continuous phase of the drilling fluid and that the fluid is substantially hydrocarbon free. This distinguishes water-base fluids from oil-base drilling fluids in which the continuous or wetting phase of the drilling fluid is a hydrocarbon. The water for the water-base drilling fluid can be fresh water, brackish water, brine, seawater, or other water-containing fluids.

Many different additives and dispersants have been utilized that provide desired properties in drilling fluids. Exemplary are barium gulfate (barite), bentonite, low and medium yield clays, salt water clay, iron oxide, calcium carbonate, starch, carboxymethylcellulose, acrylonitrile, natural gum, molecularly dehydrated phosphate, tannin compounds, quebracho, mined lignins, lignosulfonate, mica, sugar cane fibers, and granular materials. Bentonite is an especially common additive which gives the drilling fluid a thixotropic or gel structure; lignite is also a common additive which is added to the drilling fluid to control fluid loss; phosphate and lignosulfonate additives which deflocculate colloidal solids and thin the drilling fluid are also common.

Solidification of the drilling fluid is accomplished by the addition of blast furnace slag along with additives for the control of setting time and theological properties of the slag-treated fluid. The term blast furnace slag refers to the refuse from the melting of metals or reduction of ores in a furnace. Most notably, blast furnace slag is a by-product of the manufacture of steel in a blast furnace. In steel making, the blast furnace slag is discharged from the furnace as a molten stream at a temperature typically between 1400° C. and 1600° C. Rapid quenching of the slag results in its conversion into a material which has hydraulic properties. The rapid quenching of the slag converts it into a glassy state and it is generally recognized that the hydraulic quality of the slag depends upon the effectiveness of the process used to rapidly cool the slag and freeze it into the granulated, glassy state.

Silicon dioxides, aluminum oxides, iron oxides, calcium oxide, magnesium oxide, sodium oxide, potassium oxide, and sulfur are some of the chemical components in slags. The actual presence and/or amounts of these components varies since the optimum furnace operations may vary with the metals or ores being processed. Hence, there is seldom any significant flexibility to adjust the chemical composition of the slag to improve hydraulicity.

However, since the quenching process directly influences the hydraulicity, determination of hydraulic properties through chemical analysis has limited value. Two slags having the same general chemical components can have significantly different hydraulicity due to the quenching process and its effectiveness. The glass content of the slags increases with the rate of cooling and water quenching typically produces a very high cooling rate. Air quenching often produces slags with various levels of glass content due to differences in cooling rates. Smaller particles have a higher glass content due to faster cooling while the larger particles cool more slowly and have a lower glass content. Therefore, the selection of a cementitious blast furnace slag for this invention is best determined by a direct performance (strength) test of the slag mixed with water to evaluate the slag's hydraulicity.

The preferred blast furnace slag of the invention is a high glass content slag produced by quickly quenching the molten slag through intimate contact with large volumes of cool water. Slags produced by air quenching may be used in the invention provided they are determined to have cementitous properties. However, they are less desirable. The fineness of the slag should be between about 2000 cm2/g and 15,000 cm2/g and more preferably between 3000 cm2/g and 9000 cm2/g and most preferably between 4000 and. 6500 cm2/g. A commercially available blast furnace slag which fulfills the requirements of the invention is marketed under the trade name NEWCEM by the Blue Circle Atlantic Company. This slag is obtained from the Bethlehem Steel Corporation blast furnace at Sparrows Point, Md.

Additives which may be used to control setting and hardening time include alkali metal oxides and hydroxides; alkali and transition metal carbonates, sulfates, nitrates and nitrites; and alkali metal halides. Examples of such compounds include: sodium hydroxide, calcium oxide, calcium hydroxide, magnesium hydroxide, magnesium oxide, sodium carbonate, sodium sulfate, calcium sulfate, calcium nitrate, calcium nitrite, zinc oxide, zinc carbonate, titanium carbonate, potassium hydroxide, potassium sulfate, potassium nitrate, potassium nitrite, copper sulfate, sodium fluoride.

Rheological properties of the slag-treated drilling fluid can be modified through the use of many conventional chemical dispersants for water-based drilling fluids. Examples of such compounds include: lignosulfonates, napthalene sulfonates, phenol sulfonates, phosphates, phosphonates, sulfonated styrene maleic anhydride (SSMA), sulfonated toluene maleic anhydride (STMA), sulfonated styrene maleimide (SSMI), polyacrylates, polymethacrylates, blends of polyacrylates and polymethacrylates, acrylamide-acrylic acid copolymers, or blends of any of these classes of materials provided they are chemically compatible to allow their mixing while retaining the ability to disperse particles in the drilling fluid.

The lime ingredient of the drilling fluids of this invention include calcium oxide, calcium hydroxide and mixtures thereof. Gypsum, above mentioned as part of a convertible drilling fluid, includes calcium sulfate, hydrated calcium sulfate, and mixtures thereof.

Various salts, preferably inorganic salts, are suitable for use with the invention, including but not limited to NaCl, NaBr, KCl, $CaCl_2$; $NANO_3$, $NaC_2H_3O_2$, $KC_2H_4O_2$, and $KCHO_2$, among which NaCl is preferred.

The invention is very effective for solidification of water-based drilling fluids containing polyhydric alcohols. The polyalcohol ingredients of drilling fluids containing polyalcohols are preferably acyclic polyols having at least two carbon atoms and 2 hydroxyl groups but no more than 18 carbon atoms and 13 hydroxyl groups. Preferably, the polyols of the invention have at least 2 carbon atoms and 2 hydroxyl groups but no more than 9 carbon atoms and 7 hydroxyl groups.

Nonlimiting examples of such polyols include (carbon chains may be straight or branched), ethylene glycol, diethylene glycol, 1,2-propanediol, 1,3-propanediol (propylene glycol), neopentyl glycol, pentaerythritol, 1,6-hexanediol, glycerol, telomers of glycerol such as diglycerols, triglycerols, tetraglycerols, pentaglycerols, and hexaglycerols, mixtures of glycerol and telomers of glycerol such as diglycerol and triglycerols, mixtures of telomers of glycerol, polyethylene glycols, polypropylene glycols, ethylenepropylene glycol, polyethylenepropylene glycols, ethylenepropylene glycol copolymers and ethylenebutylene glycol copolymers, 1,5,6,9-decanetetrol, 1,1,4,4-cyclohexanetetramethanol, 1,2,4,5-cyclohexanetetramethanol, 1,4-cyclohexanedimethanol, 1,3-cyclopentane-dimethanol, 1,2,4,7-heptanetetrol, 1,2,3,5-heptanetetrol, 1,5,8-nonanetriol, 1,5,9-nonanetriol, 1,3,5,9-nonanetetrol, 1,3,5-heptanetriol, 2,4,6-heptanetriol, 4,4-dimethyl-1,2,3-pentanetriol, 1,1,3-cyclohexanetrimethanol, 1,3,4-cycloheptanetriol, 1,1-cyclopropanediol, 1,2-cyclopropanediol, 1,2,3-cyclopropanetriol, 1,1-cyclopropanedimethanol, 1,2-cyclopropanedimethanol, 1,2,3-cyclopropanedimethanol, 1,1-cyclobutanediol, 1,2-cyclobutanediol, 1,3-cyclobutanediol, 1,2-cyclobutanedimethanol, 1,2,3-cyclobutanetriol, 1,2,4-cyclobutanetriol, 1,2,3,4-cyclobutanetetrol, 1,3-dimethyl-1,2,3,4-cyclobutanetetrol, 1 hydroxy cyclobutanemethanol, 3-methyl-2,2-butanediol, 1,2-pentanediol, 1,3-pentanediol, 1,4-pentanediol, 2,3-pentanediol, 2,4-pentanediol, 1,2,3-pentanetriol, 1,2,4-pentanetriol, 2,3,4-pentanetriol, 1,1-cyclopentanediol, 1,2-cyclopentanediol, 1,3-cyclopentanediol, 1,2,3-cyclopentanetriol, 1,2-hexanediol, 1,3-hexanediol, 1,2,3-hexanetriol, 1,2,4-hexanetriol, 1,2,3,4-hexanetetrol, 1,1-cyclohexanediol, 1,2-cyclohexanediol, 1,4-cyclohexanediol, 1,2,4-cyclohexanetriol, 1,2,5-cyclohexanetriol, 1,2,3,4-cyclohexanetetrol, 1,2,3,5-cyclohexanetetrol, sorbitol, mannitol.

More preferred alcohols are cyclicetherpolyols having at least 6 carbon atoms, at least 2 hydroxyl groups, and at least 2 ether linkages. Even more preferred are cyclicetherpolyols having at least 15 carbon atoms, 5 ether linkages, and at least 2 hydroxyl groups, or at least 15 carbon atoms, at least 7 ether linkages and at least 3 hydroxyl groups. Most preferred are cyclicetherpolyols having at least 18 carbon atoms, at least 6 hydroxyl groups, and at least 6 ether linkages. Molecular structures with significantly larger molecular weights than the above minimums have been found to be advantageous. Among the cyclicetherpolyols, monocyclicdiatherdiols are preferred and polycyclicpolyetherpolyols are most preferred. "Poly" is used to mean two or more.

A commercially available polyol mixture (herein referred to as POLS) or polyetherpolycyclicpolyols prepared by Shell Chemical Company (herein referred to as PECP) are shown for different mud-cement combinations. The POLS sample tested herein was analyzed to be 46.8 % w propylene glycol with 16.6 % w linear dimers, 17.5 % w linear trimers, 3.8 % w linear tetramers, 3.2 % w linear pentamers, and 0.88 % w linear hexamers of propylene glycol, with less than 0.5 % w cyclics, 11 % w water, and 0.2 to 0.5 % w Na+ and K+. A typical PECP sample tested was 0.16 % w glycerol, 11.4 % w P-dioxanes, 1.1 % w cyclic trimers of glycerol, 4 % w cyclic and dicyclic tetramers of glycerol, 2 % w cyclic and dicyclic pentamers of glycerol, 2 % w dicyclic and tricyclic hexamers of glycerol, 2 % w dicyclic and tricyclic heptamers of glycerol, 3 % w dicyclic and tricyclic octamers of glycerol, 4 % w dicyclic and tricyclic nonamers of glycerol, 27 % w polycyclicpolyetherpolyols having at least 30 carbon atoms and at least 2 -cyclic ethers per molecule, 37.5 % w water, and 0.5% NaCl.

Cyclicetherpolyols can be obtained, for example, by extraction from saline water by-product streams arising from the manufacture of epoxy resins, e.g., by reaction of epichlorohydrin and bisphenol A as described in U.S. Pat. Nos. 4,560,812 and 4,599,178, which are incorporated hereinto by reference thereto. The bottom stream obtained from the distillation of synthetic and natural glycerine, usually referred to as footstill bottoms, is also a convenient source of polycyclicpolyetherpolyols of the type referred to herein. In addition, a direct synthesis route is described hereinafter. The following structures are nonlimiting examples of this class of polyols. In order to obtain cyclic diethers, the number of moles of water expelled must be at least equal to the number of glycerol (or other polyhydric, at least trihydric, polyol) used in the reaction mixture.

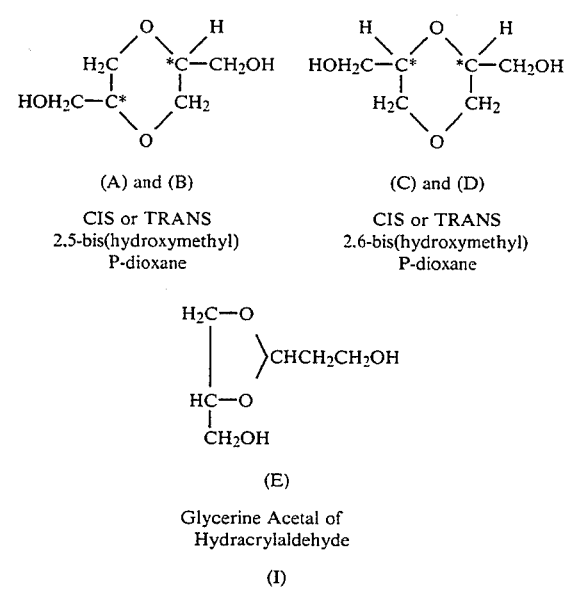

(A) and (B)

CIS or TRANS
2,5-bis(hydroxymethyl)
P-dioxane (C) and (D)

CIS or TRANS
2,6-bis(hydroxymethyl)
P-dioxane (E)

Glycerine Acetal of
Hydracrylaldehyde (I)

In structures A through D, CIS and TRANS refer to the stereoisomerism of the carbon atoms marked by an asterisk. Structures A through D can also be called bis-hydroxymethyl 1,4-P-dioxanes.

Polycyclicpolyetherpolyols may in turn be prepared by polycondensation of compounds such as (A) through (E) supra in chemical processes which are accompanied by significant expulsion of water molecules from the polymerizing compounds. The number of ether linkages equals the number of water moles expelled. Taking (C) or (D) supra as the building unit, the lowest molecular weight structure containing two such units is structure (II) infra, containing two terminal hydroxyl groups, and five ether linkages. Structure (II) is formed by condensation from glycerol molecules with the expulsion of five water molecules.

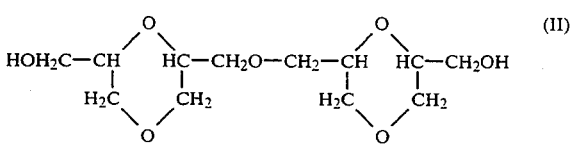

This structure is a di-cyclicpoly (or penta) etherdiol, and can be called di-bis-hydroxymethyl 1,4-P-dioxane.

Polycyclicpolyetherpolyols also can be formed by further condensation or polycondensation of Structure (II) with itself, or with itself and with polyhydric, at least trihydric, monomers, e.g., glycerol monomers. Dimerization of structure (II) with expulsion of one mole of water yields:

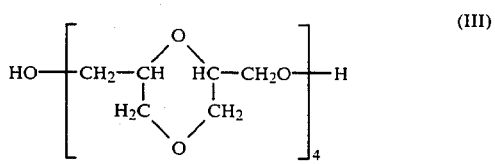

Copolycondensation of four structure (III) units with itself and with one polyhydric (at least trihydric) molecule, e.g., a glycerol molecule, can yield structure (IV) infra and its isomeric equivalents:

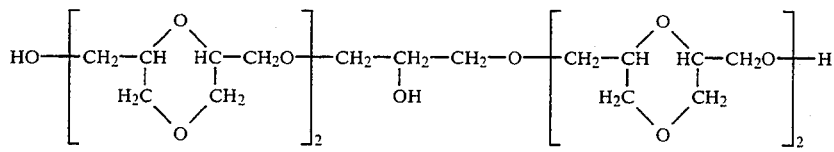

-continued

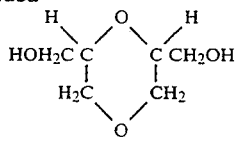

(IV)bis hydroxymethyl 1,4 p-dioxane (VI)

Analgous structures can be obtained from structures (I) (A), (I) B, and (I) E supra by polycondensation. Structures based on (E) supra will have 5-membered rings. Spectroscopic techniques cannot conveniently distinguish between the 5 or 6 membered rings.

Structure (IV) contains twelve ether linkages, three hydroxyl groups, and four six-membered cyclic diethers, and is formed by the polycondensation of nine glycerol molecules by the expulsion of twelve water molecules. The cyclic diether units and the polycondensed glycerol units, or other polyhydric (at least trihydric) units, occur randomly in the structure. Disregarding the order of occurrence, a general chemical composition formula representative of all of these structures is:

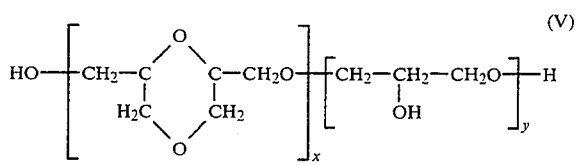

where $x \geq 1$ and $y \geq 0$.

Preparation of cyclicetherpolyols for the practice of this invention can be effected by direct synthesis route. For example, starting with glycerol, chlorohydrin can be produced, which upon treatment with NaOH at elevated temperatures yields glycidol. This molecular structure cyclicizes at still higher temperature to yield bis hydroxymethyl 1,4-p-dioxane.

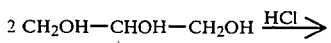

γ-monochlorohydrin

NaOH
+
heat

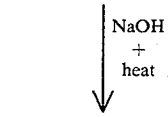

glycidol

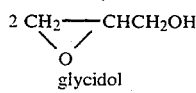

To make the higher molecular weight components from bis hydroxymethyl-1,4 p-dioxane and its isomers (I) (A-E) supra, the cyclic dimer is heated with acid (e.g., sulfuric acid) or basic (e.g., sodium acetate) catalyst while maintaining low pressure to facilitate continuous removal of the water being expelled during the condensation process. The rate of dehydration increases with increasing temperature, but excessive temperatures should be avoided to eliminate polymerization to intractable mixtures. Also it is essential to maintain an oxygen-free atmosphere over the solution while the reaction proceeds to avoid excessive oxidation and carbonization. Temperatures in the range from 150° C. to 350° C. can be employed with pressures ranging from subatmospheric to several atmospheres. The vapor pressure of the water-free organic mixture is reduced as the average molecular weight increases by condensation. However, the formation of water increases the pressure of the reactive mixture, and allows easy removal by continuous distillation of the produced water. The extent of polycondensation can be monitored by measuring the weight of produced water. For best results the moles of water expelled should be at least equal to the starting number of polyhydric (at least trihydric) moles, e.g., glycerol moles. In a preferred composition the number of moles expelled by polycondensation should be between 20% and 70% greater than the number of the polyhydric, or at least trihydric, moles of alcohol in the reacting mixture. For example, from a starting feed of 9000 grams of glycerol, 2200 to 2900 grams of water can be removed during the polycondensation process or about 24% to 32% of the initial glycerol weight.

The monomeric units which can enter into the polycondensation reactions to yield desirable polyethercyclic polyols are alcohols containing at least three hydroxyl groups per molecule of which at least two are vicinal. Thus, glycols of any molecular weight do not meet the requirements of this most preferred embodiment. On the other hand, triols are quite suitable. Examples are butane triols, such as 1,2,4 butanetriol, pentane triols, such as 1,2,3 pentanetriol, etc. An important class of polyhydric alcohols with straight carbon chains and four or more hydroxyl groups, called sugar alcohols, can also be used in preparing additive formulations containing cyclic polyethers. Sorbitol and mannitol are two such well known polyhydric alcohols.

A monomer of the structure:

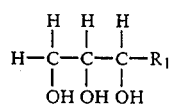 (VII)

will yield several structures, one of which is illustrated by:

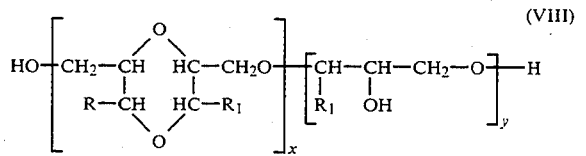 (VIII)

The $R_1$ group may itself be a group containing hydroxymethyl groups, which would in turn increase the potential for intermolecular condensation by expulsion of additional moles of water, and would increase the facility with which high molecular weight cyclic ether structures are obtained.

Examples of cyclicdietherpolyols obtained from trihydric alcohols with more than three carbons include the following:

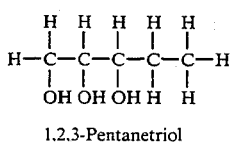 (IX)

1,2,3-Pentanetriol

The following monocyclicdietherdiols of pentanetriol are obtained from Structure IX in accordance with the methods described supra:

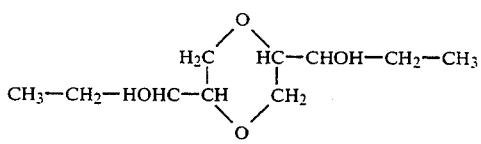 (A)

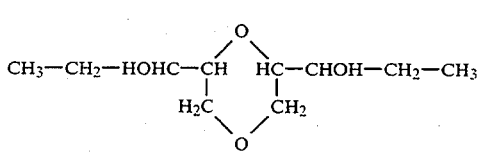 (B)

Both dimers (A) and (B) are obtained from Structure IX by reacting at carbons 1 and 2.

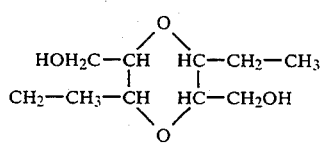 (C)

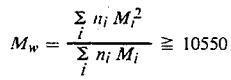 (D)

Both dimers (C) and (D) are obtained by reacting Structure (IX) at carbons 2 and 3.

(E)

(F)

Dimers (E) and (F) are obtained from (IX) by reacting at 1,2 and at 2,3 positions.

(X)

Further polycondensation of the cyclicetherdiols supra-will yield polycyclicpolyetherpolyols with structures which depend on which hydroxyl groups are involved in the condensation reaction. For instance, reaction between Structures (X) A supra and (X) F supra will yield (XI) infra, a dicyclicpentaetherdiol of pentanetriol as follows. Obviously, a large number of possible polycondensed structures exist.

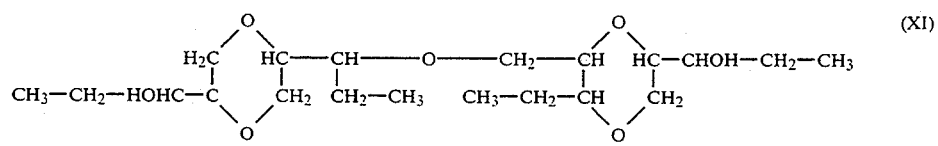 (XI)

The molecular weight of a typical composition which was found to provide excellent properties in the drilling fluid of this invention upon addition to a level of 2 % w, had molecular weight 2parameters as determined infra Number average molecular weight $M_n$ is shown by the following:

$$M_n = \frac{\sum_i n_i M_i}{\sum_i n_i} \cong 1230$$

This is the average molecular weight obtained when the total weight of the sample is divided by the number of molecules in the sample. This molecular weight determines the effect of the sample on the osmotic pressure and hence, the effect of the sample on the freezing point or other colligative properties of the total mixture.

The weight average molecular weight was found to be:

$$M_w = \frac{\sum_i n_i M_i^2}{\sum_i n_i M_i} \cong 10550$$

This molecular weight, weighs molecules proportionally to their molecular weight in the averaging process; that is, the molecular weight $M_i$, is multiplied by the weight $n_iM_i$ of material of that molecular weight rather than by the number of molecules. This type of average reflects the effect of the sample on those properties which depend on the size of the individual molecules, such as effectiveness in light scattering, or ability of the molecule to penetrate into small openings Thus, a high $M_w$ would be beneficial if penetration of the molecules into the interplanar structure of layered clays in the formulation is to be avoided. While the invention is not limited by this theory, it is believed that such a property minimizes the swelling of clay components in the wellbore, thereby improving wellbore stability.

The ratio $M_w/M_n$ is also an indication of the spread or polydispersity in the molecular weight of molecules present in the sample, and is by definition $M_w \geq M_n$. This ratio is 8.6 for the most preferred formulation, PECP (more particularly described hereinafter).

Most preferred samples of polycyclicpolyetherpolyols with beneficial effects on the properties of drilling fluids have been found to have $M_n$ values in the order of about 150 to about 2000 and $M_w$ values in the order of 1500 to 12000. The $M_n$ and $M_w$ values for POLS are 130-145 and 700-875, respectively, but POLS is superior to many other alcohols in carrying out the purposes of this invention.

Structural determination of mixtures using Mass Spectroscopy has yielded x values (see structures V and VIII supra) of 1 to 4 in portions of the sample not exceeding 14 glycerol units, thus indicating that in a significant portion of the sample $x \geq y/2$, although the invention is not limited to this theory. This procedure is limited with regard to the molecular weight of structures that it can determine, to molecules with about 50 carbon atoms.

The alcohols or mixtures of alcohols of this invention should be soluble in the drilling fluid of this invention at the temperature and pressure conditions occurring in the wellbore or can be solubilized as described infra. Additionally, the alcohols or mixtures of alcohols should not precipitate or otherwise degrade under the actions of the ions in the drilling fluid (e.g., resistant to calcium and electrolytes) and the temperature and pressure conditions occurring during drilling. The alcohols may also be soluble at the ambient temperature and pressure conditions on the surface during the preparation of the drilling fluid of this invention. Some of the higher molecular weight alcohols may be very viscous liquids, or solids or have low solubility at the temperature conditions at the surface under which the drilling fluid is prepared. In these cases, the alcohols may be diluted with a suitable solvent which is soluble in the drilling fluid at the temperature conditions of drilling fluid preparation at the surface. Such suitable solvents may act both to lower viscosity and to increase solubility of the higher molecular weight alcohol for addition to the drilling fluid on the surface. Such solvents may be polyols of lower molecular weight, other alcohols such as methanol, ethanol, propanol, or isopropanol, water or mixtures of solvents and water.

The concentration of alcohol in the water phase used to prepare the drilling fluid of this invention will generally be at least about 2% by weight and preferably from about 2 to about 30% by weight based on the water phase and more preferably from about 5 to about 15% by weight; excellent results have been obtained with concentrations between about 10 and about 20% by weight. Preferably at least about 1 % w of the alcohol is cyclicetherpolyol or acyclic polyol, based on the total weight of the alcohol.

FIG. 3 provides flow schemes for the three basic processes of the invention: (I) conversion of a non-lime mud to a lime mud followed by solidification, (II) solidification of a lime mud, and (III) solidification of a non-lime mud without converting the mud to a lime mud. All three processes have the last few steps in common, i.e., addition of blast furnace slag followed by displacement of the mud and allowing it to set (harden) in-situ.

The invention is very effective for the solidification of water based drilling fluid without polyhydric alcohol.

Three muds are shown in process (I) which are exemplary of known muds useful with this process, i.e., (1) seawater/lignosulfonate, (2) seawater/gypsum, and (3) sodium chloride/partially hydrolyzed polyacrylamide. In order to accomplish the objectives of the invention, drilling fluids such as those enumerated are converted into lime-based drilling fluids. Referring again to FIG. 3, the first step under process (I), step (a), is the addition of dispersant, e.g., sodium acrylate. Dispersant may or may not be required. About one to ten pounds of dispersant per barrel of drilling fluid is usually suitable. In step (b), as shown in FIG. 3, the drilling fluid is converted to a lime-based drilling fluid by the addition of lime and viscosity reducers. About one to ten pounds of lime per barrel of drilling fluid is required. Also, about one to ten pounds of viscosity reducer (such as styrene sulphonic acid maleic anhydride copolymers) per barrel of drilling fluid is usually suitable but may not be required. After the above treatment, the muds of process (I) can then be treated the same as the muds of process (II).

Process (II) pertains to the solidification of a lime mud. Lime muds are preferred in practicing the invention due in part to the benefit of solidification of the filter cake deposited by lime muds during drilling. This results in improved hardening of the filter cake as shown by the figures. Exemplary muds are (1) high lime, (2) low lime, and (3) low lime/salt/alcohol. By "low lime" is meant a mud having up to about 0.5 to 3.0 pounds of excess lime per barrel of mud. By "high lime" is meant a mud having from about 2.0 to 15 pounds of excess lime per barrel of mud. Mud number (3) has about 1 to 3.0 pounds of excess lime, about 18 to 109 pounds of salt, and about 1 to 168 pounds of alcohol per barrel of drilling fluid.

Step (c) (see FIG. 3) requires the treatment of muds from both Processes (I) and (II) with sodium carbonate or zinc carbonate. From about 0.70 to 25.0 pounds of sodium or zinc carbonate per barrel of drilling fluid is required. Dispersant in an amount from about 0.5 to 15 pounds per barrel of drilling, may or may not be required, in accordance with step (d).

Mixing of the drilling fluid is required in step (e). Coincident with this step, the drilling fluid from process (III) (see FIG. 3) is treated with the same steps as the drilling fluids of processes (I) and Referring now to process (III), a procedure is provided for solidification of water-based mud without conversion to lime-based mud. Exemplary muds known to the art are (1) seawater gypsum, (2) seawater lignosulfonate, and (3) fresh water/salt water, and partially hydrolyzed polyacrylamide.

In step (f), the water-based mud of process (III) is admixed with about 0.5 to 15 pounds of sodium hydroxide or potassium hydroxide. Thereupon, the mud of process (III) is processed in accordance with the same steps as the muds of processes (I) and (II) (see FIG. 3), beginning with mixing in step (e) as described supra.

In step (g), the mud is admixed with preferably about 100 to 300 pounds of blast furnace slag per barrel of drilling fluid. As described supra, a preferred slag is marketed under the trademark NewCem. Step (h) requires the addition of set control additives (which may be accelerators or retarders). Reference may be had to the preceding description of such additives.

Pursuant to step (i) the drilling fluid is displaced in accordance with techniques known to the art (see Description of Prior Art) to a desired location. Finally, as shown in step (j) of FIG. 3, the drilling fluid is allowed to set in-situ for about 6 to 48 hours at a temperature of 40° to 400° F. thereby functioning as a cement

EXAMPLES

In Table 1, formulations for the muds tested are shown. The central idea initially was to determine if the salt/alcohol/lime mud systems could be solidified (Formulations I–V). Testing of a field mud and the seawater/lignosulfonate muds was done in order to determine if a water based mud could be converted to lime and then solidified as described supra.

The rheologies for the experiments done with the salt/alcohol/lime mud system are given in Table 2 infra. For the different testing protocols followed, the different rheological parameters are shown at each step in the procedure. In short, reasonable theologies can be obtained with the addition of KOH and/or sodium carbonate and blast furnace slag (such as "NEWCEM"). Tests 18–21 indicate that extremely thin theologies can be obtained if the initial formulation has 4 lb/bbl "MOREX" (polysaccharide from Grain Processing Corporation) followed by a treatment with Petrolite's "EXO 314 ®" (acrylic polymer in water from Petrolite's Oilfield Chemical Group). Although not tested, it is expected that "MILTEMP" (sulfonated styrene maleic anhydride, trademark of Milpark) could also be used to keep the rheologies low if necessary.

In Table 3, the procedure and rheologies necessary to solidify the field mud and the seawater lignosulfonate mud are shown at each step in the procedure. The field mud resulted in extremely low theologies while the seawater lignosulfonate was higher. However, the results indicate that the seawater lignosulfonate mud could be thinned if necessary using either Miltemp, lignosulfonate, or "EXO 314 ®".

In Table 4, the rheologies were tested for both the salt/alcohol/lime mud and the field mud using Portland cement instead of "NEWCEM". In both cases, thick rheologies were obtained.

In Tables 5 and 6, the results of the UCA (testing compressive strength as a function of time with a nondestructive test) are shown. As shown, several different formulations were tried. From the data, it is clear that potassium hydroxide and/or sodium carbonate are required to obtain any reasonable initial set time (Table 5). Sodium carbonate alone, however, is quite sufficient to obtain good initial set times. The addition of "MILTEMP" did extend the initial set time. In Table 6, the compressive strength indicated by the UCA as a function of time is shown. In all cases, the compressive strengths were more than adequate.

In Table 7, the density change in the system when "NEWCEM" was added is shown. Approximately for every 100 lbs/bbl of "NEWCEM", an increase of 1.0 lb/gallon was realized. Table 8 compares results from the UCA nondestructive compressive strength method with destructive tests for solidified samples of the salt-/alcohol/lime mud system. The results indicate compressive strengths which are more than adequate for cement and that the destructive tests measure on the order of 1.5 times higher compressive strengths than those obtained with the UCA.

The concept of converting a lignosulfonate mud to a lime mud followed by solidification was tested (Table 9). For both the field mud and the seawater lignosulfonate mud, it is clear that the simple addition of soda ash and NewCem give adequate strengths within a reasonable time. This suggests that this technology is easily applicable to a large number of field muds.

In Table 10, destructive experiments are shown which illustrate the addition of NaOH along with "NEWCEM" to initiate solidification. The - example is merely illustrative and conditions and additives have not been optimized. However, in both tests it is clear that the simple addition of NaOH followed by "NEWCEM" is sufficient to solidify the two mud systems. However, in the case of the field mud the treatment with lime followed with sodium carbonate and then "NEWCEM" did appear to accelerate the process relative to treatment with NaOH and "NEWCEM". These results suggest that with the three approaches, most if not all muds can be easily solidified.

In Table 11, the use of Portland cement in either-the salt/alcohol/lime mud or the field mud was tested. The results clearly indicate that the Portland cement is not effective.

Figure 2:
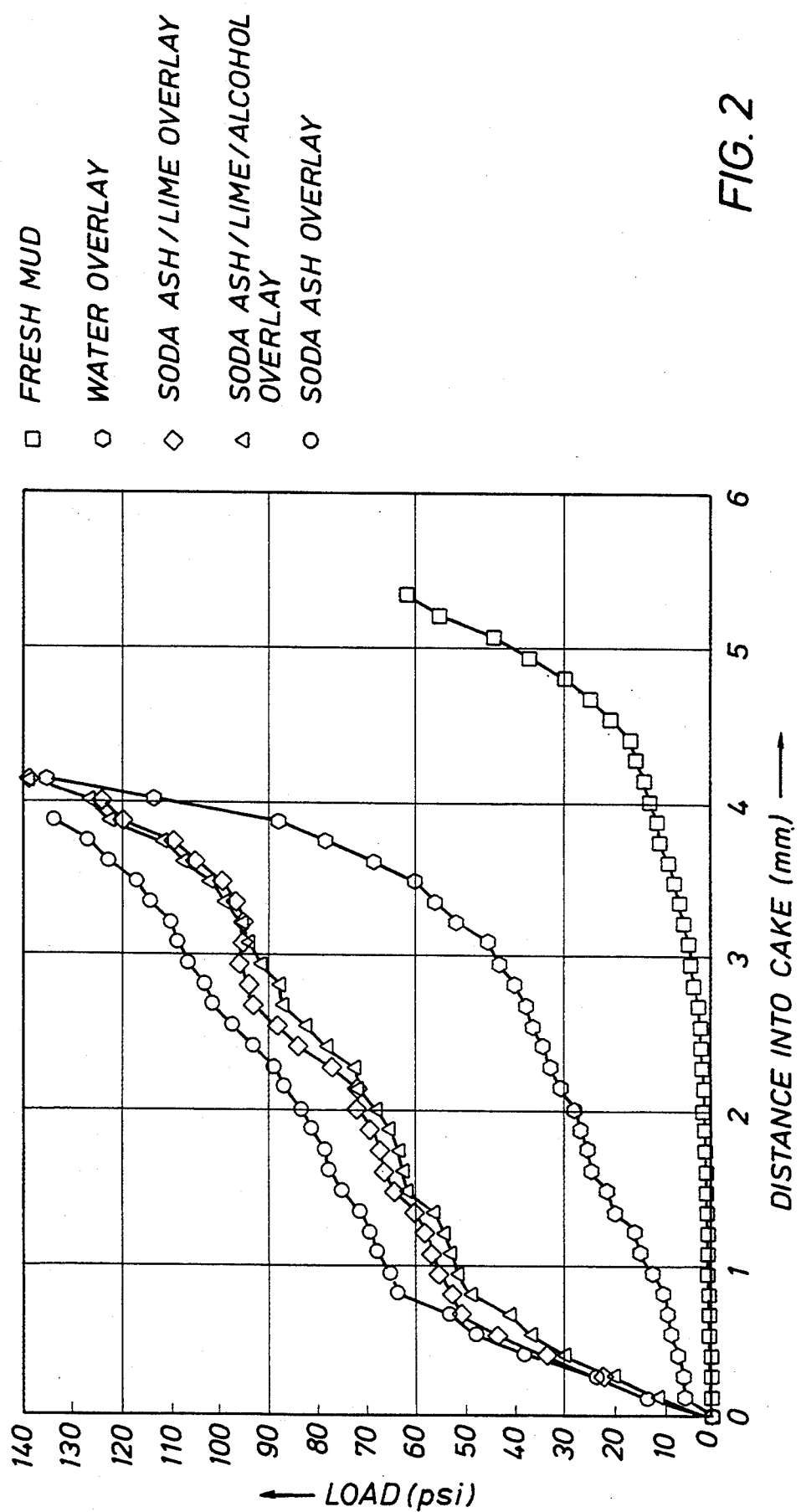

One of the important questions is whether the filter cakes will harden when drilling with the salt/alcohol/lime mud system. In FIGS. 1 and 2, results are given which indicate that the filter cake of the mud will, with time, harden; however, the presence of soda ash and/or lime increase the rate of this hardening process considerably. This is an important result since it suggests that bonding to the filter cake in this system is good. The presence of soda ash can be ensured by sweeping the hole before displacement with a soda ash sweep. However, in reality this will probably not be necessary since the soda ash after treated mud placement will diffuse into and through the cake.

TABLE 1

| Formulation Number | I | II | IIA | III | IV | V | Seawater/ Ligno- sulfonate | Bullwinkle Field Mud |
|---|---|---|---|---|---|---|---|---|
| Fresh water (mls) | — | — | — | — | — | — | 287.00 | — |
| Sea Salt (gm) | — | — | — | — | — | — | 12.10 | — |
| Seawater/NaCl (90/10% w/w) (mls) | 263.8 | 263.8 | 263.8 | 234.5 | 235.1 | 210.8 | — | — |
| Beontinite[1] (gm) | 20.0 | 20.0 | 20.0 | 20.0 | 20.0 | 20.0 | 40.00 | — |
| "REV DUST"[2] (gm) | 25.0 | 25.0 | 25.0 | 25.0 | 25.0 | 25.0 | 40.00 | — |
| "MOREX"[3] (gm) | 3.0 | 1.5 | 4.0 | 3.0 | 1.0 | 3.0 | — | — |
| Lime (gm) | 4.0 | 4.0 | 4.0 | 4.0 | 4.0 | 4.0 | — | — |
| Barite[4] (gm) | 158.6 | 158.6 | 158.6 | 151.0 | 296.0 | 409.7 | 128.00 | — |

TABLE 1-continued

| Formulation Number | I | II | IIA | III | IV | V | Seawater/Ligno-sulfonate | Bullwinkle Field Mud |
|---|---|---|---|---|---|---|---|---|
| "BIOZAN"[5] (gm) | 2.0 | 1.5 | 1.5 | 1.5 | 1.0 | 1.0 | — | — |
| "PERMALOSE"[6] (gm) | 6.0 | 6.0 | 6.0 | 6.0 | 6.0 | 6.0 | — | — |
| "POLYDRILL"[7] (gm) | 6.0 | 6.0 | 6.0 | 6.0 | 6.0 | 6.0 | — | — |
| POLS[8] (gm) | 36.9 | 36.9 | 36.9 | 73.9 | 31.7 | 28.4 | — | — |
| "SPERSENE"[9] (gm) | — | — | — | — | — | — | 6.00 | — |
| "POLYPAC"[10] (gm) | — | — | — | — | — | — | 1.00 | — |
| NaOH (gm) | — | — | — | — | — | — | 1.0 to 2.0 | — |
| Density (ppg) | 12.5 | 12.5 | 12.5 | 12.5 | 15.0 | 17.0 | 12.00 | 14.3 |

[1] Bentonite is a clay or colloidal clay thickening agent.
[2] "REV DUST" is a trade name for clay/quartz solid dust manufactured by MilWhite Corp.
[3] "MOREX" is a trade name for water-soluble carbohydrate polymer manufactured by Grain Processing Company.
[4] Barite is $BaSO_4$, a drilling fluid weighting agent.
[5] "BIOZAN" is a biopolymer manufactured by Kelco Oil Field Group, Inc.
[6] "PERMALOSE" is a tradename for starch made by Milpark Inc.
[7] "POLYDRILL" is a tradename for synthetic polymer manufactured by SKW Chemicals Inc.
[8] See definition supra of POLS.
[9] "SPERSENE" is a trade name for chromlignosulfonate manufactured by Dresser Magcobar Inc.
[10] "POLYPAC" is carboxymethylcellulose from MI Drilling Fluids Inc.

TABLE 2

Rheologies for Salt/Lime/Alcohol Muds

| Test Number | 1 | 2 | 3 | 4 | 5 | 6 | 7 | 8 | 9 | 10 | 11 | 12 |
|---|---|---|---|---|---|---|---|---|---|---|---|---|
| Formulation Number | II | II | II | II | II | II | II | II | II | II | IV | IV |
| Additives | | | | | | | | | | | | |
| KOH (gm) | — | — | — | 5.0 | 5.0 | 10.0 | 10.0 | 5.0 | 5.0 | 5.0 | — | — |
| Sodium Carbonate (gm) | — | 5.0 | 10.0 | 5.0 | 10.0 | — | 10.0 | — | — | — | — | 5.0 |
| MilTemp[1] (gm) | — | — | — | — | — | — | — | — | 1.0 | 6.0 | — | — |
| *Properties after 10 minutes of mixing at 75° F.* | | | | | | | | | | | | |
| Density (ppg) | 12.5 | 12.5 | 12.5 | 12.5 | 12.5 | 12.5 | 12.5 | 12.5 | 12.5 | 12.5 | 15.0 | 15.0 |
| Plastic Viscosities (cps) | 42.0 | 46.0 | 48.0 | 56.0 | 56.0 | 36.0 | 60.0 | 51.0 | 51.0 | 48.0 | 55.0 | 84.0 |
| Yield Point (lb/100 ft$^2$) | 26.0 | 26.0 | 30.0 | 42.0 | 41.0 | 27.0 | 57.0 | 41.0 | 43.0 | 42.0 | 21.0 | 53.0 |
| 10-second gel (lb/100 ft$^2$) | 7.0 | 8.0 | 12.0 | 9.0 | 8.0 | 8.0 | 25.0 | 13.0 | 14.0 | 13.0 | 4.0 | 16.0 |
| 10-minute gel (lb/100 ft$^2$) | 14.0 | 18.0 | 22.0 | 19.0 | 18.0 | 32.0 | 40.0 | 39.0 | 35.0 | 29.0 | 14.0 | 38.0 |
| Additives | | | | | | | | | | | | |
| "NEWCEM"[2] (gm) | | 200.0 | 200.0 | 200.0 | 200.0 | 200.0 | 200.0 | 300.0 | 300.0 | 300.0 | 200.0 | 200.0 |
| "MILTEMP"[1] (gm) | — | — | — | — | — | — | — | — | 5.0 | — | — | — |
| *Properties after 10 minutes of mixing at 75° F.* | | | | | | | | | | | | |
| Density (ppg) | | 14.5 | 14.5 | 14.5 | 14.5 | 14.5 | 14.5 | 15.5 | 15.2 | 15.2 | 17.0 | 17.0 |
| Plastic Viscosities (cps) | | 98.0 | 106.0 | 118.0 | 108.0 | 98.0 | 176.0 | — | 180.0 | 196.0 | — | 102.0 |
| Yield Point (lb/100 ft$^2$) | | 82.0 | 100.0 | 76.0 | 84.0 | 76.0 | 192.0 | — | 150.0 | 168.0 | — | 94.0 |
| 10-second gel (lb/100 ft$^2$) | | 68.0 | 96.0 | 36.0 | 58.0 | 50.0 | 152.0 | 236.0 | 43.0 | 44.0 | — | 74.0 |
| 10-minute gel (lb/100 ft$^2$) | | 100.0 | 116.0 | 74.0 | 98.0 | 130.0 | 318.0 | 308.00 | 70.0 | 72.0 | — | 116.0 |

| Test Number | 13 | 14 | 15 | 16 | 17 | 18 | 19 | 20 | 21 |
|---|---|---|---|---|---|---|---|---|---|
| Formulation Number | V | V | III | III | II | IIA | IIA | IIA | IIA |
| Additives | | | | | | | | | |
| KOH (gm) | — | — | — | — | — | — | — | — | — |
| Sodium Carbonate (gm) | — | 5.0 | — | 5.0 | 5.0 | 5.0 | 5.0 | 5.0 | 5.0 |
| MilTemp[1] (gm) | — | — | — | — | — | — | — | — | — |
| *Properties after 10 minutes of mixing at 75° F.* | | | | | | | | | |
| Density (ppg) | 17.0 | 17.0 | 12.5 | 12.5 | 12.5 | | | | |
| Plastic Viscosities (cps) | 30.0 | 84.0 | 27.0 | 26.0 | 37.0 | | | | |
| Yield Point (lb/100 ft$^2$) | 15.0 | 53.0 | 9.0 | 7.0 | 24.0 | | | | |
| 10-second gel (lb/100 ft$^2$) | 6.0 | 16.0 | 2.0 | 3.0 | 7.0 | | | | |
| 10-minute gel (lb/100 ft$^2$) | 15.0 | 38.0 | 3.0 | 8.0 | 25.0 | | | | |
| Additives | | | | | | | | | |
| "NEWCEM"[2] (gm) | 200.0 | 200.0 | 200.0 | 200.0 | 100.0 | 200.0 | 200.0 | 200.0 | 200.0 |
| "MILTEMP"[1] (gm) | — | 1.0 | — | — | — | — | — | — | — |
| *Properties after 10 minutes of mixing at 75° F.* | | | | | | | | | |
| Density (ppg) | 19.0 | 19.0 | 14.5 | 14.5 | 14.5 | 14.5 | 14.5 | 14.5 | 14.5 |
| Plastic Viscosities (cps) | — | 112.0 | — | 121.0 | 27.0 | 53.0 | 46.0 | 48.0 | 105.0 |
| Yield Point (lb/100 ft$^2$) | — | 95.0 | — | 77.0 | 17.0 | 26.0 | 19.0 | 18.0 | 50.0 |
| 10-second gel (lb/100 ft$^2$) | — | 65.0 | — | 35.0 | 12.0 | 9.0 | 7.0 | 4.0 | 18.0 |
| 10-minute gel (lb/100 ft$^2$) | — | 96.0 | — | 72.0 | 17.0 | 29.0 | 25.0 | 15.0 | 52.0 |

[1] "MILTEMP" is a tradename for sulfonated styrene maleic anhydride manufactured by Milpark.
[2] "NEWCEM" is a tradename for blast furnace slag manufactured by Blue Circle Atlantic Inc.

TABLE 3

Rheologies for Seawater-Based Muds

| | Test Number | | | | | |
|---|---|---|---|---|---|---|
| | 22 Bullwinkle Field Mud | 23 Bullwinkle Field Mud | 24 Hot Rolled Overnight Bullwinkle Field Mud | 25 Seawater/ Ligno-sulfonate | 26 10-Minute Mix Ligno-sulfonate | 27 Hot Rolled Overnight Seawater/ Ligno-sulfonate |
| Additives | A-33 | A-33 | A-33 | | | |
| | 8/14/89 | 8/14/89 | 8/14/89 | | | |
| Lime (gm) | — | 4.0 | 4.0 | | 4.0 | 4.0 |
| MilTemp[1] (gm) | — | 2.0 | 2.0 | | 2.0 | 2.0 |
| Density (ppg) | 14.3 | 14.3 | 14.3 | 12.5 | 12.5 | 12.5 |
| Plastic Viscosities (cps) | 20.0 | 24.0 | 17.0 | 28.0 | 70.0 | 38.0 |
| Yield Point (lb/100 ft$^2$) | 19.0 | 27.0 | 4.0 | 20.0 | 84.0 | 14.0 |
| 10-second gel (lb/100 ft$^2$) | 17.0 | 19.0 | 2.0 | 3.0 | 29.0 | 2.0 |
| 10-minute gel (lb/100 ft$^2$) | 74 | 120.0 | 2.0 | 8.0 | 82.0 | 8.0 |
| Soda Ash 5 lb/bbl followed by 10-minute mix | | | | | | |
| Plastic Viscosities (cps) | | | 18.0 | | | 39.0 |
| Yield Point (lb/100 ft$^2$) | | | 3.0 | | | 14.0 |
| 10-second gel (lb/100 ft$^2$) | | | 2.0 | | | 19.0 |
| 10-minute gel (lb/100 ft$^2$) | | | 3.0 | | | 120.0 |
| 200 gm "NEWCEM"[2] followed by 10-minute mix | | | | | | |
| Plastic Viscosities (cps) | | | 56.0 | | | 112.0 |
| Yield Point (lb/100 ft$^2$) | | | 18.0 | | | 106.0 |
| 10-second gel (lb/100 ft$^2$) | | | 74.0 | | | 58.0 |
| 10-minute gel (lb/100 ft$^2$) | | | 116.0 | | | 130.0 |

[1] "MILTEMP" is a tradename for sulfonated styrene maleic anhydride manufactured by Milpark.
[2] "NEWCEM" is a tradename for blast furnace slag manufactured by Blue Circle Atlantic Inc.

TABLE 4

Evaluation of Portland Cement

| | Test Number | |
|---|---|---|
| Formulation | 28 Overnight Bullwinkle | 29 II |
| Plastic Viscosities (cps) | 20 | 39 |
| Yield Point (lb/100 ft$^2$) | 2 | 24 |
| 10-second gel (lb/100 ft$^2$) | 1 | 8 |
| 10-minute gel (lb/100 ft$^2$) | 2 | 13 |
| Soda Ash 5 lb/bbl followed by 10-minute mix | | |
| Plastic Viscosities (cps) | 21 | 100 |
| Yield Point (lb/100 ft$^2$) | −2 | 84 |
| 10-second gel (lb/100 ft$^2$) | 1 | 27 |
| 10-minute gel (lb/100 ft$^2$) | 2 | 45 |
| 200 gm Portland Cement Class H followed by 10-minute mix | | |
| 600 rpm | Too thick to measure. | |
| Plastic Viscosities (cps) | | |
| Yield Point (lb/100 ft$^2$) | | |
| 10-second gel (lb/100 ft$^2$) | | |
| 10-minute gel (lb/100 ft$^2$) | | |
| Added 1 lb/bbl "MILTEMP"[1] then mixed 10 minutes | | |
| Plastic Viscosities (cps) | 50 | 56 |
| Yield Point (lb/100 ft$^2$) | 54 | 42 |
| 10-second gel (lb/100 ft$^2$) | 52 | 24 |
| 10-minute gel (lb/100 ft$^2$) | 236 | 56 |

[1] "MILTEMP" is a tradename for sulfonated styrene maleic anhydride manufactured by Milpark

TABLE 5

Initial Setting Times of Salt/Lime/Polyalcohol Drilling Fluid Containing "NEWCEM"[10] Blast Furnace Slag at 150° F. Curing Pressure: 3000 psi

| Drilling Fluid Formulation Number | Drilling Fluid Composition | Test Number | Additives Used for Solidification[9] | Time Required to Reach 50 psi Compression Strength |
|---|---|---|---|---|
| 1 | 0.77 bbl Water[1]<br>20.00 lbs/bbl Bentonite[2]<br>25.00 lbs/bbl "REV DUST"[3]<br>4.00 lbs/bbl Lime<br>3.00 lbs/bbl "MOREX"[4]<br>2.00 lbs/bbl "BIOZAN"[5]<br>6.00 lbs/bbl "PERMALOSE"[6]<br>6.00 lbs/bbl "POLYDRILL"[7]<br>36.90 lbs/bbl POLS[8]<br>158.60 lbs/bbl Barite[12] | | 200 lbs/bbl "NEWCEM"[10]<br><br>200 lbs/bbls "NEWCEM"[10] + 10 lbs/bbl KOH<br><br>200 lbs/bbl NEWCEM"[10] + 10 lbs/bbl + 10 lbs/bbl Soda Ash | 99.4 hours<br><br>62.0 hours<br><br>1.0 hour |
| 2 | 0.77 bbl Water[1]<br>20.00 lbs/bbl Bentonite[2]<br>25.00 lbs/bbl "REV DUST"[3]<br>4.00 lbs/bbl Lime<br>1.50 lbs/bbl "MOREX"[4]<br>1.50 lbs/bbl "BIOZAN"[5]<br>6.00 lbs/bbl "PERMALOSE"[6]<br>6.00 lbs/bbl "POLYDRILL"[7] | 1<br><br><br>6<br><br><br>2 | 200 lbs/bbl "NEWCEM"[10]<br><br>200 lbs/bbls "NEWCEM"[10] + 10 lbs/bbl KOH<br><br>200 lbs/bbl NEWCEM"[10] + | 59.0 hours<br><br>22.2 hours<br><br>7.6 hours |

TABLE 5-continued

Initial Setting Times of Salt/Lime/Polyalcohol Drilling Fluid Containing "NEWCEM"[10] Blast Furnace Slag at 150° F.
Curing Pressure: 3000 psi

| Drilling Fluid Formulation Number | Drilling Fluid Composition | Test Number | Additives Used for Solidification[9] | Time Required to Reach 50 psi Compression Strength |
|---|---|---|---|---|
| | 36.90 lbs/bbl POLS[8]<br>158.60 lbs/bbl Barite[12] | | 5 lbs/bbl Soda Ash | |
| | | 3 | 200 lbs/bbl "NEWCEM"[10] +<br>10 lbs/bbl Soda Ash | 4.5 hours |
| | | 4 | 200 lbs/bbl "NEWCEM"[10] +<br>5 lbs/bbl KOH +<br>5 lbs/bbl Soda Ash | 2.3 hours |
| | | 5 | 200 lbs/bbl "NEWCEM"[10] +<br>5 lbs/bbl KOH +<br>10 lbs/bbl Soda Ash | 1.9 hours |
| | | 7 | 200 lbs/bbl "NEWCEM"[10] +<br>10 lbs/bbl KOH +<br>10 lbs/bbl Soda Ash | 1.2 hours |
| | | 8 | 300 lbs/bbl "NEWCEM"[10] +<br>5 lbs/bbl Soda Ash | 2.9 hours |
| | | 10 | 300 lbs/bbl "NEWCEM"[10] +<br>5 lbs/bbl Soda Ash<br>6 lbs/bbl "MILTEMP"[11]<br>(all "MILTEMP"[11] was added to drilling fluid prior to addition of "NEWCEM"[10]) | 28.2 hours |
| | | 9 | 300 lbs/bbl "NEWCEM"[10] +<br>5 lbs/bbl Soda Ash<br>6 lbs/bbl "MILTEMP"[11]<br>(1 lb/bbl of "MILTEMP"[11] was added to the drilling fluid prior to the addition of the "NEWCEM"[10]. The remaining amount was added after the "NEWCEM"[10] addition.) | 35.4 hours |
| 3 | 0.67 bbl water[1]<br>20.00 lbs/bbl Bentonite[2]<br>25.00 lbs/bbl "REV DUST"[3]<br>4.00 lbs/bbl Lime<br>3.00 lbs/bbl "MOREX"[4]<br>1.50 lbs/bbl "BIZAN"[5]<br>6.00 lbs/bbl "PERMALOSE"[6]<br>6.00 lbs/bbl "POLYDRILL"[7]<br>73.90 lbs/bbl POLS[8]<br>151.00 lbs/bbl Barite[12] | 16 | 200 lbs/bbl "NEWCEM"[10] +<br>5 lbs/bbl Soda Ash | 6.8 hours |
| 4 | 0.67 bbl water[1]<br>20.00 lbs/bbl Bentonite[2]<br>24.00 lbs/bbl "REV DUST"[3]<br>4.00 lbs/bbl Lime<br>1.00 lb/bbl "MOREX"[4]<br>1.00 lb/bbl "BIOZAN"[5]<br>6.00 lbs/bbl "PERMALOSE"[6]<br>6.00 lbs/bbl "POLYDRILL"[7]<br>36.90 lbs/bbl POLS[8]<br>296.00 lbs/bbl Barite[12] | 12 | 200 lbs/bbl "NEWCEM"[10] +<br>5 lbs/bbl Soda Ash | 3.3 hours |

[1] Water phase composed of seawater with 10% NaCl (w/w) added.
[2] Bentonite is a clay or colloidal clay thickening agent.
[3] "REV DUST" drill solids is a trade name for clay/quartz solid dust manufactured by MilWhite and is added to simulate drilled solids which would be present in a drilling fluid under actual drilling operations.
[4] "MOREX" is a trade name for water-soluble carbohydrate polymer manufactured by Grain Processing Company.
[5] "BIOZAN" is a trade name for biopolymer manufactured by Kelco Oil Field Group, Inc.
[6] "PERMALOSE" is a trade name for starch manufactured by Milpark.
[7] "POLYDRILL" is a trade name for synthetic polymer manufactured by SKW Chemicals.
[8] See definition supra of POLS.
[9] Additives for solidification were added to one barrel of the drilling fluid. The final volume and density increased as a result of the addition of these materials. See Table 7 for density changes.
[10] "NEWCEM" is a trade name for blast furnace slag manufactured by Blue Circle Atlantic, Inc.
[11] "MILTEMP" is a trade name for sulfonated styrene maleic anhydride manufactured by Milpark.
[12] Barite is $BaSO_4$, a drilling fluid weighting agent.

TABLE 6

Compressive Strength Development of Salt/Lime/Polyalcohol Containing "NEWCEM"[10] Blast Furnace Slag at 150° F.

| Drilling Fluid Formulation Number | Drilling Fluid Composition | Test Number | Additives Used for Solidifications | Compressive Strength After Indicated Elapsed Time at 150° F. | | | | |
|---|---|---|---|---|---|---|---|---|
| | | | | 24 Hours | 48 Hours | 72 Hours | 96 Hours | 120 Hours |
| 1 | 0.77 bbl Water[1]<br>20.00 lbs/bbl Bentonite[2]<br>25.00 lbs/bbl "REV DUST"[3]<br>4.00 lbs/bbl Lime<br>3.00 lbs/bbl "MOREX"[4]<br>2.00 lbs/bbl "BIOZAN"[5]<br>6.00 lbs/bbl "PERMALOSE"[6]<br>6.00 lbs/bbl "POLYDRILL"[7]<br>36.90 lbs/bbl POLS[8]<br>158.60 lbs/bbl Barite[12] | | 200 lbs/bbl "NEWCEM"[10] | 0 | 0 | 0 | 0 | 750 |
| | | | 200 lbs/bbls. "NEWCEM"[10] + 10 lbs/bbl KOH | 0 | 0 | 260 | 500 | 525 |
| | | | 200 lbs/bbl "NEWCEM"[10] + 10 lbs/bbl + 10 lbs/bbl Soda Ash | 725 | 810 | 850 | 875 | 910 |
| 2 | 0.77 bbl Water[1]<br>20.00 lbs/bbl Bentonite[2]<br>25.00 lbs/bbl "REV DUST"[3]<br>4.00 lbs/bbl Lime<br>1.50 lbs/bbl "MOREX"[4]<br>1.50 lbs/bbl "BIOZAN"[5]<br>6.00 lbs/bbl "PERMALOSE"[6]<br>6.00 lbs/bbl "POLYDRILL"[7]<br>36.90 lbs/bbl POLS[8]<br>158.60 lbs/bbl Barite[12] | 1 | 200 lbs/bbl "NEWCEM"[10] | 0 | 0 | 525 | 630 | 670 |
| | | 6 | 200 lbs/bbl "NEWCEM"[10] + 10 lbs/bbl KOH | 270 | 975 | — | — | — |
| | | 2 | 200 lbs/bbl "NEWCEM"[10] + 5 lbs/bbl Soda Ash | 775 | 865 | 940 | 1000 | — |
| | | 3 | 200 lbs/bbl "NEWCEM"[10] + 10 lbs/bbl Soda Ash | 910 | 1010 | 1080 | 1150 | — |
| | | 4 | 200 lbs/bbl "NEWCEM"[10] + 5 lbs/bbl KOH + 5 lbs/bbl Soda Ash | 800 | 880 | 950 | 990 | — |
| | | 5 | 200 lbs/bbl "NEWCEM"[10] + 5 lbs/bbl KOH + 10 lbs/bbl Soda Ash | 1150 | 1290 | 1380 | 1440 | — |
| | | 7 | 200 lbs/bbl "NEWCEM"[10] + 10 lbs/bbl KOH + 10 lbs/bbl Soda Ash | 890 | 1020 | — | — | — |
| | | 8 | 300 lbs/bbl "NEWCEM"[10] + 5 lbs/bbl Soda Ash | 1180 | — | — | — | — |
| | | 10 | 300 lbs/bbl "NEWCEM"[10] + 5 lbs/bbl Soda Ash 6 lbs/bbl "MILTEMP"[11] (All "MILTEMP"[11] was added to drilling fluid prior to addition of "NEWCEM"[10].) | 0 | 1300 | — | — | — |
| | | 9 | 300 lbs/bbl "NEWCEM"[10] + 5 lbs/bbl Soda Ash 6 lbs/bbl "MILTEMP"[11] (1 lb/bbl of "MILTEMP"[11] was added to the drilling fluid prior to the addition of the "NEWCEM"[10]. The remaining amount was added after the "NEWCEM"[10] addition.) | 0 | 650 | — | — | — |
| 3 | 0.67 bbl Water[1]<br>20.00 lbs/bbl Bentonite[2]<br>25.00 lbs/bbl "REV DUST"[3]<br>4.00 lbs/bbl Lime<br>3.00 lbs/bbl "MOREX"[4]<br>1.50 lbs/bbl "BIOZAN"[5]<br>6.00 lbs/bbl "PERMALOSE"[6]<br>6.00 lbs/bbl "POLYDRILL"[7]<br>73.90 lbs/bbl POLS[8]<br>151.00 lbs/bbl Barite[12] | 16 | 200 lbs/bbl "NEWCEM"[10] + 5 lbs/bbl Soda Ash | 1360 | 1640 | — | — | — |
| 4 | 0.67 bbl water[1]<br>20.00 lbs/bbl Bentonite[2]<br>25.00 lbs/bbl "REV DUST"[3]<br>4.00 lbs/bbl Lime<br>1.00 lb/bbl "MOREX"[4]<br>1.00 lbs/bbl "BIOZAN"[5]<br>6.00 lbs/bbl "PERMALOSE"[6]<br>6.00 lbs/bbl "POLYDRILL"[7]<br>36.90 lbs/bbl POLS[8] | 12 | 200 lbs/bbl "NEWCEM"[10] + 5 lbs/bbl Soda Ash | 1960 | 2120 | — | — | — |

TABLE 6-continued

Compressive Strength Development of Salt/Lime/Polyalcohol Containing "NEWCEM"[10] Blast Furnace Slag at 150° F.

| Drilling Fluid Formulation Number | Drilling Fluid Composition | Test Number | Additives Used for Solidifications | Compressive Strength After Indicated Elapsed Time at 150° F. | | | | |
|---|---|---|---|---|---|---|---|---|
| | | | | 24 Hours | 48 Hours | 72 Hours | 96 Hours | 120 Hours |
| | 296.00 lbs/bbl Barite[12] | | | | | | | |

[1]Water phase composed of seawater with 10% NaCl (w/w) added.
[2]Bentonite is a clay or colloidal clay thickening agent.
[3]"REV DUST" drill solids is a trade name for clay/quartz solid dust manufactured by MilWhite and is added to simulate drilled solids which would be present in a drilling fluid under actual drilling operations.
[4]"MOREX" is a trade name for water-soluble carbohydrate polymer manufactured by Grain Processing Company.
[5]"BIOZAN" is a trade name for biopolymer manufactured by Kelco Oil Field Group, Inc.
[6]"PERMALOSE" is a trade name for starch manufactured by Milpark.
[7]"POLYDRILL" is a trade name for synthetic polymer manufactured by SKW Chemicals.
[8]See definitions supra of POLS.
[9]Additives for solidification were added to one barrel of the drilling fluid. The final volume and density increased as a result of the addition of these materials. See Table 7 for density changes.
[10]"NEWCEM" is a trade name for blast furnace slag manufactured by Blue Circle Atlantic, Inc.
[11]"MILTEMP" is a trade name for sulfonated styrene maleic anhydride manufactured by Milpark.
[12]Barite is $BaSO_4$, a drilling fluid weighting agent.

TABLE 7

Effect of Solidification Materials on Final Density of Fluid

| Original Drilling Fluid Density | Final Density of Fluid After Addition of: | |
|---|---|---|
| | 200 lbs/bbl "NEWCEM" | 300 lbs/bbl "NEWCEM" |
| 12.5 lbs/gal | 14.5 lbs/gal | 15.2 lbs/gal |
| 15.0 lbs/gal | 17.1 lbs/gal | — |
| 17.0 lbs/gal | 19.0 lbs/gal | — |

TABLE 8

Solidification of Seawater Systems

| Test Number | Drilling Fluid Composition Number | Additives for Solidification[1] | Compressive Strength | | Total Curing Time at 150° F. |
|---|---|---|---|---|---|
| | | | Non-Destructive Test[2] | Destructive Test[3] | |
| 3 | 2 | 200 lbs/bbl "NEWCEM"[4] + 10 lbs/bbl Soda Ash | 1144 psi | 1868 psi | 94 hours, 11 minutes |
| 4 | 2 | 200 lbs/bbl "NEWCEM"[4] + 5 lbs/bbl KOH + 5 lbs/bbl Soda Ash | 972 psi | 1635 psi | 94 hours, 16 minutes |
| 5 | 2 | 200 lbs/bbl "NEWCEM"[4] + 5 lbs/bbl KOH + 10 lbs/bbl Soda Ash | 1422 psi | 2146 psi | 94 hours, 20 minutes |
| 2 | 2 | 200 lbs/bbl "NEWCEM"[4] + 5 lbs/bbl Soda Ash | 985 psi | 1376 psi | 94 hours, 24 minutes |
| 18 | 2A | 200 lbs/bbl "NEWCEM"[4] + 5 lbs/bbl Soda Ash | — | 1556 psi[5] | 48 hours |
| 19 | 2A | 200 lbs/bbl "NEWCEM"[4] + 5 lbs/bbl Soda Ash | — | 1485 psi[5] | 48 hours |
| 20 | 2A | 200 lbs/bbl "NEWCEM"[4] + 5 lbs/bbl Soda Ash | — | 1655 psi[5] | 48 hours |
| 21 | 2A | 300 lbs/bbl "NEWCEM"[4] + 5 lbs/bbl Soda Ash | — | 2252 psi[5] | 48 hours |

[1]Additives for solidification were added to one barrel of the drilling fluid. The final volume and density increased as a result of the addition of these materials. See Table 7 for density changes.
[2]Performed on the Halliburton Ultrasonic Cement Analyzer at 150° F. and under 3000 psi confining pressure.
[3]Performed at atmospheric pressure and ambient (75° F.) temperature on the samples taken from the Halliburton Ultrasonic Cement Analyzer.
[4]"NEWCEM" is a trade name for blast furnace slag manufactured by Blue Circle Atlantic Inc.
[5]Cured for 48 hours at 150° F. and tested.

TABLE 9

Solidification of Seawater Systems

| Drilling Fluid Composition | Test Number | Additives Used for Solidification[1] | Compressive Strength After Indicated Elapsed Time at 150° F. | |
|---|---|---|---|---|
| | | | 24 Hours | 48 Hours |
| Seawater/Lignosulfonate | 24 | 200 lbs/bbl "NEWCEM"[2] + 5 lbs/bbl Soda Ash | 1360 | 1640 |
| Bullwinkle Field Mud | 27 | 200 lbs/bbl "NEWCEM"[2] + | 1960 | 2120 |

TABLE 9-continued

Solidification of Seawater Systems

| Drilling Fluid Composition | Test Number | Additives Used for Solidification[1] | Compressive Strength After Indicated Elapsed Time at 150° F. | |
|---|---|---|---|---|
| | | | 24 Hours | 48 Hours |
| | | 5 lbs/bbl Soda Ash | | |

[1]Additives for solidification were added to one barrel of the drilling fluid. The final volume and density increased as a result of the addition of these materials. See Table 7 for density changes.
[2]NewCem is a tradename for blast furnace slag manufactured by Blue Circle Atlantic Inc.

TABLE 10

KCl-Partially Hydrolyzed Polyacrylamide (PHPA) Mud and Bullwinkle Field Mud

| Additive | KCl/PHPA Mud Amount (lb/bbl) | | Field Mud Amount (lb/bbl) | |
|---|---|---|---|---|
| Lime | 4 | | 4 | |
| Sodium Carbonate | 5 | | 5 | |
| NaOH | | 4 | | 4 |
| "NEWCEM" | 200 | 200 | 200 | 200 |

| Time (Hours) | KCl/PHPA Mud Compressive Strength (psi) | | Field Mud Compressive Strength (psi) | |
|---|---|---|---|---|
| 24 | 735 | 738 | 2429 | — |
| 48 | 807 | 801 | 2620 | — |
| 72 | 919 | 956 | 2673 | 1765 |
| 96 | | | | 2133 |
| 120 | | | | 2341 |

Destructive test performed at atmospheric pressure and ambient temperature. KCl-PHPA mud had the following formulation: water 0.834 bbl, bentonite 6 lbs/bbl, partially hydrolyzed polyacrylamide (PHPA) 0.6 lb/bbl, KCl 18 lbs/bbl, KOH 0.3 lb/bbl, carboxymethyl cellulose low viscosity 2 lbs/bbl, drill solids 30 lb/bbl and barite 86.1 lbs/bbl.

TABLE 11

Solidification With Portland Cement

| Drilling Fluid Composition | Test Number | Additives Used for Solidification[1] | Compressive Strength After Indicated Elapsed Time at 150° F. | | |
|---|---|---|---|---|---|
| | | | 24 Hours | 48 Hours | 72 Hours |
| II | 28 | 200 lbs/bbl Portland Cement class H + 5 lbs/bbl Soda Ash | 0 | 0 | 360 |
| Bullwinkle Field Mud | 29 | 200 lbs/bbl Portland Cement class H + 5 lbs/bbl Soda Ash | 0 | 0 | 0 |

[1]Additives for solidification were added to one barrel of the drilling fluid. The final volume and density increased as a result of the addition of these materials. See Table 7 for density changes.

What is claimed is:

1. A method for drilling and cementing a well, comprising
   drilling a borehole with a drilling fluid containing seawater and lignosulfonate,
   depositing a filter cake on the borehole wall,
   converting the drilling fluid to a lime drilling fluid by addition of lime and treating with sodium carbonate or zinc carbonate;
   adding blast furnace slag to the drilling fluid to form a cementitious slurry,
   displacing the slurry into the borehole, and
   allowing the slurry to set and bond to the filter cake.

2. A method for drilling and cementing a well, comprising
   drilling a borehole with a drilling fluid containing salt water and partially hydrolyzed polyacrylamide,
   depositing a filter cake on the borehole wall,
   treating the drilling fluid with sodium hydroxide or potassium hydroxide,
   adding blast furnace slag to the drilling fluid to form a cementitious slurry,
   displacing the slurry into the borehole, and
   allowing the slurry to set and bond to the filter cake.

3. A method for drilling and cementing a well, comprising
   drilling a borehole with a drilling fluid containing seawater/gypsum,
   depositing a filter cake on the borehole wall,
   converting the drilling fluid to a lime drilling fluid by addition of lime and treating with sodium carbonate or zinc carbonate;
   adding blast furnace slag to the drilling fluid to form a cementitious slurry,
   displacing the slurry into the borehole, and
   allowing the slurry to set and bond to the filter cake.

4. A method for drilling and cementing a well, comprising
   drilling a borehole with a drilling fluid containing sodium chloride/partially hydrolyzed polyacrylamide,
   depositing a filter cake on the borehole wall,
   converting the drilling fluid to a lime drilling fluid by addition of lime and treating with sodium carbonate or zinc carbonate;
   adding blast furnace slag to the drilling fluid to form a cementitious slurry,
   displacing the slurry into the borehole, and
   allowing the slurry to set and bond to the filter cake.

* * * * *